United States Patent [19]

Walbeck et al.

[11] Patent Number: 5,302,150
[45] Date of Patent: Apr. 12, 1994

[54] DESINEWING BELT

[76] Inventors: Mark V. Walbeck, 610 Alton Woods; David M. H. Stewart, 90 N. Spring St., Unit 3, both of Concord, N.H. 03301; Alan T. Cushing, 216 Grapevine Rd., Dunbarton, N.H. 03045

[21] Appl. No.: 79,020
[22] Filed: Jun. 18, 1993
[51] Int. Cl.⁵ .................................. A22C 17/00
[52] U.S. Cl. ................................ 452/138; 452/135
[58] Field of Search .......... 452/138, 135, 172, 141, 452/142

[56] References Cited

U.S. PATENT DOCUMENTS

| | | | |
|---|---|---|---|
| 3,142,860 | 8/1964 | Churchill | 452/141 |
| 3,594,190 | 7/1971 | Eslinger | 99/109 |
| 3,829,931 | 8/1974 | Suerbaum | 452/138 |
| 4,637,694 | 1/1987 | Matsubayashi | 452/138 |
| 4,899,890 | 2/1990 | Ewing et al. | 425/138 |

FOREIGN PATENT DOCUMENTS

| | | | |
|---|---|---|---|
| 990573 | 6/1976 | Canada | 452/138 |
| 2093331 | 9/1982 | United Kingdom | 452/138 |

OTHER PUBLICATIONS

CIGO Specification Sheet.
Baader Brochure.

Primary Examiner—Willis Little
Attorney, Agent, or Firm—William B. Ritchie

[57] ABSTRACT

A novel composite belt for an desinewing apparatus that uses a belt in combination with a perforated drum. The three layer composite has a monofilament woven polyester carcass between layers of USDA food approved urethane strengthened by adding 10% by weight of ultra high molecular weight polyethylene. The life expectancy of the invention is expected to double that of currently available belts used in such machinery.

6 Claims, 1 Drawing Sheet

DESINEWING BELT

BACKGROUND OF THE INVENTION

1. Field of the Invention

The invention relates to belts for machinery useful for desinewing food products such as meat, poultry and fish.

2. Description of the Related Art

The food processing industry must deal with the problem of separating meat from bones as efficiently as possible. Obtaining meat from the desinewing process that is still raw is far more valuable than obtaining the meat cooked. Raw meat has a substantially higher binding capacity than does cooked meat. Food processors define binding capacity as the ability of meat to form a stable mixture with added fat, water and salt.

Numerous ways have been developed to accomplish the desinewing process with the meat being maintained in the raw state until it is processed at a later stage. U.S. Pat. No. 3,594,190, issued to Eslinger et al. on Jul. 20, 1971, which claims tumbling the meat laden with bones in a drum with a salt brine mixture to remove the bones from the meat. This reference includes a comprehensive yet concise review of the primary techniques for recovering meat from bones.

One class of mechanical devices uses a belt driven mechanism. Representative of this type is U.S. Pat. No. 3,142,860, issued to Churchill on Aug. 4, 1964, which discloses a belt having yieldable frusto-conical projections that engage a platen having frusto-conical projections. When the food to be processed is passed between the belt and platen, the projections tend to shred and remove the meat from the bones.

One widely used mechanical method is the use of a rotating perforated drum and belt apparatus such as manufactured by BAADER food processing machinery. This method of mechanical separation permits a wide range of applications from beef legs to fish. The food to be processed is drawn between the perforated drum and the squeezing belt. The food is subjected to increasing pressure causing the meat to be move into the perforated drum. The hard material such as bones and other sinew are discarded. The recovered desinewed meat is discharged from the drum via an endless screw arrangement.

The advantages of this system are many. The meat is neither ground nor crushed, nor exposed to any thermal load. By selecting different drum sizes, belt sizes and mechanical or hydraulic power appropriately, this type of machine is highly versatile.

The prime difficulty with this type of machine is the belt. The belt serves as the mechanical carrier of the food to be processed to the drum. The belt also provides the pressure which keeps the food product in contact with the rotating drum as the soft material is scraped off, leaving the bone and sinew behind. A typical belt is rubber covered having internal support plies which are also rubber covered and fabric based. The life expectancy of this type of belt is quite short, making frequent replacement necessary.

SUMMARY OF THE INVENTION

It is an object of the invention to provide a desinewing belt for food processing machinery that has a substantially greater life expectancy when compared to present belts.

It is another object of the invention to provide a desinewing belt for food processing machinery that is composed of USDA food approved materials.

It still another object of the invention to provide a desinewing belt for food processing machinery that is a composite producing structural improvements in tensile strength and durability not present in the individual components.

The invention is a belt for use with a perforated drum desinewing apparatus for processing food. The belt is a composite. A monofilament fabric layer is provided. The monofilament fabric layer is made endless. The fabric layer has a carrying side and a running side. A carrying layer is also provided. The carrying layer is located adjacent to the carrying side of said fabric layer. The carrying layer has a textured surface. It has a durometer in the range of 30A to 60A. The carrying layer also has a thickness. The textured surface is adapted to cause soft material to be separated from the sinew of the food to be processed and pressed through the perforated drum of said apparatus. A running layer is provided. The running layer is located adjacent to the running side of said monofilament layer. The thickness of the running layer is substantially less than the thickness of said carrying layer. The running layer has a durometer that corresponds to the durometer of said carrying layer. The running layer has a substantially smooth surface that is adapted to be driven by the drive mechanism of said apparatus. An additive is also provided. The additive is added to said carrying layer and said drive layer and comprises at least five percent by weight of said carrying and drive layers wherein said additive substantially increases the tensile strength of said carrying and drive layers.

DETAILED DESCRIPTION OF THE INVENTION

To better understand the advantages provided by the novel belt described herein, the inventors carefully analyzed the reasons that present belts fail so quickly. The typical sized belt, for example, for the BAADER machine discussed above, is 93½ inches in circumference and about ten inches wide. Many of the present belts use an overlap method to make continuous the ends of the internal support structure commonly referred to as the belt "carcass". Also, other types of splices are used to join the ends. However, if the joining method results in the carcass being greater in thickness in at least a portion of the joining region. Also, the belts are typically rubber covered.

The primary cause of premature belt failure is due to the food processing surface of the belt being cut or torn by bone fragments. The processing method of squeezing the food containing bones unevenly distributed between the belt and perforated drum places the belt under extreme stress where bone is pressed between the belt and drum. Food grade rubber coatings can be easily cut in this process resulting in sections of the belt being removed and rendering the belt useless.

Another cause of failure is the use of cotton or other fabric for the belt carcass. This is especially troublesome for designs that do not cover the entire carcass with an exterior covering. The raw edge of the belt will wick blood and other fluids present during the food processing operation to the interior of the belt causing the belt to quickly delaminate.

Figure 1:
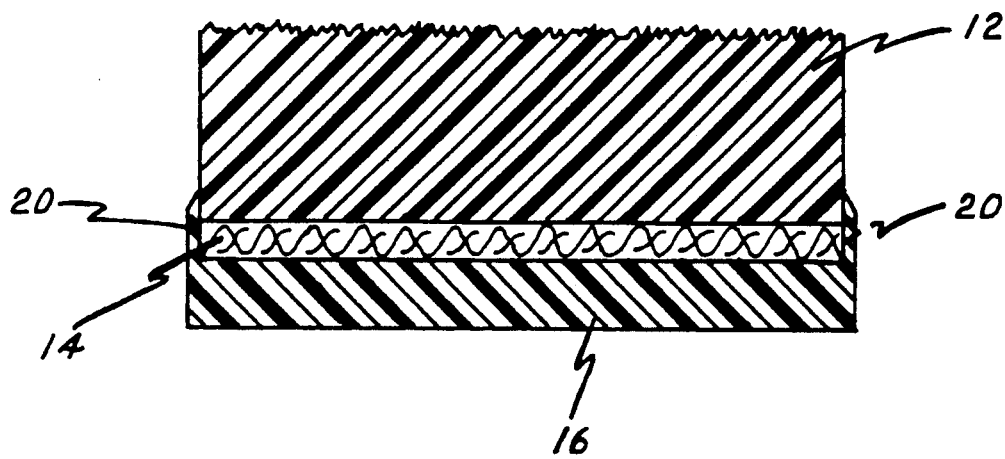
FIG. 1 is a cross-sectional view of the desinewing belt in accordance with the invention.

FIG. 1 is a cross-sectional view of the desinewing belt 10. A monofilament fabric carcass 14 provides the structural framework for belt 10. Preferably, carcass 14 is a European style 2 ply 100% polyester woven monofilament carcass with a thermoplastic PVC or polyurethane interply. Since carcass 14 is a thermoplastic, it can be joined in a continuous manner by vulcanizing a finger over finger joint. Thus, the irregularities found with other types of splices or joining methods are eliminated.

The next step in the process of fabricating belt 10 is to treat carcass 14 by roughening the surface of carcass 14 and thoroughly cleaning it so that the top and bottom layers can be applied.

Figure 2:
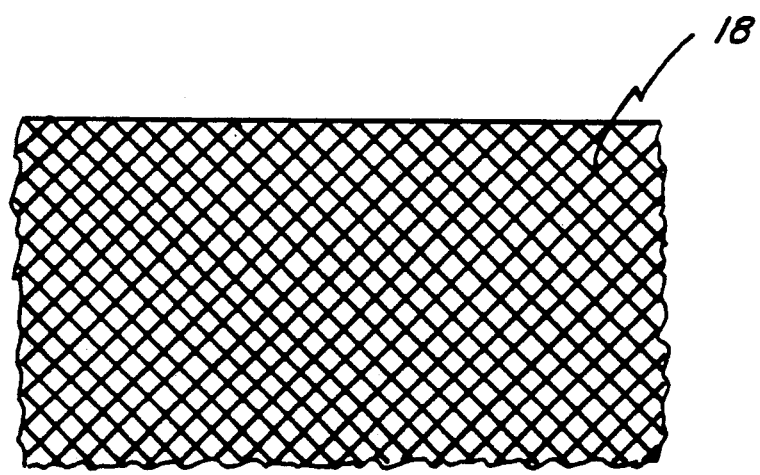
FIG. 2 is a top view of the desinewing belt showing the food processing surface.

The first layer to be added is the layer that will contact the perforated drum of the desinewing apparatus. Carrying layer 12 is preferably molded to carcass 14. Layer 12 is preferably USDA food approved urethane such as type 8007 as made by Uniroyal. The durometer selected for layer 12 depends on the type of food material that is to be processed. For example, beef requires the durometer to be in the range of 40A to 60A; poultry in the range of 30A to 50A. The durometer range for commonly processed food materials is from 30A to 60A. The surface of layer 12 (shown in FIG. 2) is molded with a diamond-shaped knurling to enhance the desinewing effectiveness of belt 10 yet providing an easy to clean surface. Preferably, the lines of the diamond shape are 1/16 to ⅛ deep, with 5-10 "diamonds" per square inch of belt surface. The preferred thickness of layer 12 is preferably ⅝ inches for the example of belt 10 provided herein. However, different lengths and widths of belt 10 may necessitate changing the thickness proportionately.

After carrying layer 12 has been attached to carcass 14, a drive layer 16 is attached. It is also possible that both carrying layer 12 and drive layer 16 may be attached to carcass 16 in a single step using a rotary molding process. The preferable thickness of drive layer 16 is approximately ⅛ inch. Additionally, layer 20 may be attached to the raw edge of carcass 14, thereby completely enclosing carcass 16. As discussed above, a fabric carcass can wick blood and other fluids to the center of the belt thus causing delamination. In order to encase fabric carcasses, a substantial thickness of covering is required to protect against delamination. This substantial thickness weakens the belt in the region where there is not carcass support.

While carcass 14 is inherently hydrophobic and will not wick fluid, the addition of layer 20, preferably about ⅛ to ¼ inches thick ensures that no fluid can be transmitted to the bonding interface between carcass 16 and layers 12 and 16 which might cause delamination.

Prior to molding layers 12 and 16 to carcass 16, ultra high molecular weight (UHMW) polyethylene, such as AIRPRODUCT's UH 1060 can be added to the urethane to strengthen the resistance of layers 12 and 16 to being cut and torn. The inventors have found that adding approximately 10% by weight of UHMW polyethylene greatly enhances the wear characteristics of the belt and improves the desinewing capabilities as well. While more or less of UHMW polyethylene could be used, at least 5% by weight is recommended. It is expected that the life expectancy of the invention will be double that of prior art belts.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A belt for use with a perforated drum desinewing apparatus for processing food comprising:
    a composite of a monofilament fabric layer that is continuous, said layer having a carrying side and a running side;
    a carrying layer, having a thickness, adjacent to the carrying side of said monofilament layer, and having a textured surface and a durometer in the range of 30A to 60A, adapted to cause soft material to be separated from the sinew of the food to be processed and pressed through the perforated drum of said apparatus;
    a running layer, adjacent to the running side of said monofilament layer and having a thickness substantially less than the thickness of said carrying layer, and having a durometer corresponding to the durometer of said carrying layer and having a substantially smooth surface that is adapted to drive said apparatus;
    an additive which is added to said carrying layer and said drive layer and comprises at least five percent by weight of said carrying and drive layers wherein said additive substantially increases the tensile strength of said carrying and drive layers.

2. The belt of claim 1 wherein said monofilament layer is a woven polyester carcass.

3. The belt of claim 2 wherein said carrying layer is urethane of the type approved for use with food.

4. The belt of claim 3 wherein said drive layer is urethane of the type approved for use with food.

5. The belt of claim 4 wherein said additive is ultra high molecular weight polyethylene.

6. The belt of claim 5 wherein said carrying layer is five times the thickness of said drive layer.

* * * * *